US012018595B2

(12) United States Patent
Keune et al.

(10) Patent No.: US 12,018,595 B2
(45) Date of Patent: Jun. 25, 2024

(54) BOILER FLUSHING

(71) Applicant: Siemens Energy Global GmbH & Co. KG, Bayern (DE)

(72) Inventors: Christian Keune, Heiligenhaus (DE); Detlef Bock, Erlangen (DE)

(73) Assignee: Siemens Energy Global GmbH & Co. KG, Bayern (DE)

( * ) Notice: Subject to any disclaimer, the term of this patent is extended or adjusted under 35 U.S.C. 154(b) by 26 days.

(21) Appl. No.: 17/782,648

(22) PCT Filed: Oct. 22, 2020

(86) PCT No.: PCT/EP2020/079678

§ 371 (c)(1),
(2) Date: Jun. 4, 2022

(87) PCT Pub. No.: WO2021/115674

PCT Pub. Date: Jun. 17, 2021

(65) Prior Publication Data

US 2022/0389843 A1 Dec. 8, 2022

(30) Foreign Application Priority Data

Dec. 13, 2019 (DE) .................... 10 2019 219 613.6

(51) Int. Cl.
*F01K 23/10* (2006.01)
*F22B 37/56* (2006.01)

(52) U.S. Cl.
CPC .............. *F01K 23/10* (2013.01); *F22B 37/56* (2013.01)

(58) Field of Classification Search
CPC .................................. F02C 7/26; F01K 23/10
See application file for complete search history.

(56) References Cited

U.S. PATENT DOCUMENTS 5,819,539 A * 10/1998 Bauver, II ............... F22B 37/42 60/646
5,907,949 A * 6/1999 Falke ........................ F02C 7/26 60/790

(Continued)

FOREIGN PATENT DOCUMENTS

CH 704715 A1 9/2012
DE 19744917 A1 4/1999

(Continued)

OTHER PUBLICATIONS

PCT International Search Report and Written Opinion of International Searching Authority mailed Feb. 24, 2021 corresponding to PCT International Application No. PCT/EP2020/079678 filed Oct. 22, 2020.

*Primary Examiner* — Thuyhang N Nguyen
(74) *Attorney, Agent, or Firm* — Wolter Van Dyke Davis, PLLC

(57) ABSTRACT

A method for flushing a heat recovery steam generator in a power plant having a gas turbine, having a compressor, a combustion chamber and a turbine with a rotor, and having a generator coupled to the gas turbine and a start-up converter to convert from an alternating current of random frequency into an alternating current of a specified frequency. The start-up converter is connected to an output of the generator at which the alternating current of random frequency is applied. Wherein, when the gas turbine is run down, the rotor is cushioned with the help of the start-up converter at a boiler flushing speed and the heat recovery steam generator is further flushed until the specifications for flushing the waste heat steam generator are complied with.

19 Claims, 2 Drawing Sheets

(56) References Cited

U.S. PATENT DOCUMENTS

| | | | | |
|---|---|---|---|---|
| 6,340,002 | B1 | 1/2002 | Liebig | |
| 7,861,534 | B2 * | 1/2011 | Terlecki | F01D 19/00 60/778 |
| 2002/0092304 | A1 | 7/2002 | Liebig et al. | |
| 2004/0065089 | A1 | 4/2004 | Liebig | |
| 2013/0174535 | A1 * | 7/2013 | Van Straaten | F02C 9/18 60/269 |
| 2013/0249213 | A1 * | 9/2013 | Oesterheld | F02C 9/18 290/31 |
| 2018/0058335 | A1 * | 3/2018 | Alexander | F01D 25/30 |
| 2018/0058337 | A1 | 3/2018 | Alexander et al. | |
| 2018/0058338 | A1 | 3/2018 | Snider et al. | |

FOREIGN PATENT DOCUMENTS

| | | | |
|---|---|---|---|
| DE | 19959342 | A1 | 6/2001 |
| DE | 10117101 | A1 | 10/2002 |
| EP | 1219801 | A2 | 7/2002 |
| EP | 2644839 | A1 | 10/2013 |

* cited by examiner

Gas turbine speed [Hz]
70.0
60.0
50.0
40.0
30.0
20.0
10.0
0.0
Time [s]
0
60
120
180
240
300
360
420
480
540
600
660
720
780
840
900
960
1020
1080
1140
1200
1260
1320
t1
t2
9
10
11

BOILER FLUSHING

CROSS REFERENCE TO RELATED APPLICATIONS

This application is the U.S. National Stage of International Application No. PCT/EP2020/079678 filed 22 Oct. 2020, and claims the benefit thereof. The International Application claims the benefit of German Application No. DE 10 2019 219 613.6 filed 13 Dec. 2019. All of the applications are incorporated by reference herein in their entirety.

FIELD OF INVENTION

The invention relates to a method for flushing a heat recovery steam generator of a power plant.

BACKGROUND OF INVENTION

Stationary gas turbines and methods for operating the gas turbines are known extensively from the available prior art. Gas turbines of a modern type of construction, which are used for generating electrical energy, generally have an axial throughflow compressor, one or more combustion chambers and a turbine unit. During operation, a fuel that is fed to the combustion chamber is burned with the aid of the ambient air compressed by the compressor to form a hot gas, which in the turbine unit expands at the rotor of the gas turbine so as to perform work. The rotor then drives a generator, which converts the mechanical energy into electrical energy with little loss and feeds it into a power distribution grid.

As is known, short starting times of the gas turbine, in particular in the case of power plants for covering load peaks, are playing an increasingly greater role on the gas turbine market, since short starting times are financially relevant for the power plant operators (availability). An example of a method for the quick starting of a gas turbine installation is disclosed by EP 2 644 839 A1, according to which, when starting the gas turbine, the generator is connected to the electrical grid by way of the frequency converter before the operating speed of the gas turbine is reached, the frequency converter being controlled in such a way that it generates an output current with the grid frequency.

In order to use the hot exhaust gases of the gas turbine, connected downstream of the gas turbine on the exhaust-gas side in a gas-and-steam turbine installation is a heat recovery steam generator (boiler), the heating surfaces of which are connected into the water-steam circuit of a steam turbine.

For such installations, it is typically necessary before igniting the gas turbine to carry out so-called boiler flushing, in which the gas turbine is brought to a so-called flushing speed and is flushed with fresh air until it is ensured that all of the explosive fuel mixtures have been flushed out of the heat recovery steam generator. The boiler flushing process is also referred to as ventilating or pre-ventilating, but the term flushing or purging is more correctly used for the process. There are explicit specifications and codes of practice for this. In particular, once a trip (unplanned or emergency shutdown) has been triggered, the exhaust system and the heat recovery steam generator must be flushed before the next start of the gas turbine. DE 199 59 342 A1 discloses in this connection a combined power plant and states that it is usually prescribed for safety reasons to flush the heat recovery steam generator with air after an interruption in operation before renewed starting up of the installation. Depending on the volume of the boiler, such boiler flushing, including running up to speed and running down, takes about 15 minutes. As in the case of purely gas turbine installations, short starting times are also financially relevant in the case of gas-and-steam turbine installations.

A further aspect of the invention can be seen in the matter that, after running down a gas turbine from load at nominal speed, the temperature of the exhaust gas falls with a very high gradient. If a trip is involved, boiler flushing must take place as a necessity before the next start of the gas turbine. In the case of a hot start, this increases the stresses in the gas turbines and on the thick-walled components of the heat recovery steam generator, because comparatively cold ambient air is sucked in for the flushing and is blown through both the gas turbine and the heat recovery steam generator. Furthermore, the gas turbine housing cools down more quickly than the rotor. This leads to smaller gaps at the gas turbine, which can result in a closing up of clearances (rubs). Seen in the medium term, as a result the gas turbine has a deterioration in sealing properties due to enlargement of gaps and it is likely that there will be a loss of efficiency. This problem could be solved by increasing the cold gaps in the gas turbine, but leads to poorer efficiencies. Furthermore, the heat recovery steam generator would have to be of a more expensive design (higher-quality materials).

SUMMARY OF INVENTION

The object of the invention is to provide a method for flushing a heat recovery steam generator of a power plant.

The invention achieves this object by providing that, in the case of such a method for flushing a heat recovery steam generator of a power plant with a gas turbine, comprising a rotor, and with a generator coupled to the gas turbine and a start-up converter for converting from an alternating current of any frequency into an alternating current of a specified frequency, wherein the start-up converter is connected to an output of the generator at which the alternating current of any frequency is applied, when the gas turbine is run down the rotor is supported with the aid of the start-up converter at a boiler flushing speed and the heat recovery steam generator is flushed further until the specifications for flushing the heat recovery steam generator are satisfied. The boiler flushing speed should be understood as meaning the speed at which the gas turbine is operated in flushing mode, i.e. the speed is sufficiently high that a volume exchange required by standards takes place in the heat recovery steam generator, in order that remains of unburned fuel that are possibly present are reliably removed, and thus for example undesired self-ignition is avoided. To put it another way, this means for the rotor that, for example starting from a nominal speed, it rotates slower and slower when the gas turbine is running down, but without going below the boiler flushing speed for a specified duration. Instead of the classic boiler flushing after a trip and before restarting, it is possible to use the flushing volume when running down the gas turbine (starting from nominal speed) under the following preconditions:

On account of the relevant safety regulations, the fuel system usually comprises a gas lock. A gas lock comprises two fittings, for example ball valves, which can be opened or closed for gas to flow through. An intermediate relief or a pressure line is connected in between these two fittings. This gas lock is closed (passed after a few seconds).

The gas turbine operates above the boiler flushing speed.

The air intake flap and stack damper are open.

Preferably, after reaching a boiler flushing speed of the gas turbine, a gas turbine speed is repeatedly raised and lowered, but without going below the boiler flushing speed. This avoids lengthy periods of time in which the gas turbine stays in ranges of critical frequencies (natural frequencies).

With preference, the gas turbine speed is repeatedly raised and lowered at least until a minimum duration for a flushing process has been reached. It is expedient in this respect to comply with corresponding (international) standards, such as for example the minimum duration for the flushing process, which is typically 5 minutes, since a certain volume exchange in the boiler is necessary for successful completion of the flushing (for example, the standard NFPA85 includes the requirement "at least 5 minutes"). To ensure this, when running down the gas turbine, the rotor may be supported with the aid of the start-up converter at the boiler flushing speed and flushing continued until the aforementioned requirements are met.

It is expedient to keep the gas turbine speed above the boiler flushing speed, since it is also standardized for the flushing process and is typically 8% of the nominal speed.

With the invention, the running down of the gas turbine is already used as boiler flushing. Furthermore, the start-up converter is used during the running down of the gas turbine in order to make the boiler flushing meet all of the standard requirements in as short a time as possible. Furthermore, the method according to the invention avoids flushing of components of the gas turbine and the heat recovery steam generator that are still hot with comparatively cold ambient air.

This method improves the starting availability, extends the component lifetime and gives the power plant a performance advantage by providing smaller design gaps and fewer "rubbing" incidents in the gas turbine.

BRIEF DESCRIPTION OF THE DRAWINGS

The invention is explained in more detail by way of example on the basis of the figures, in which schematically and not to scale.

DETAILED DESCRIPTION OF INVENTION

Figure 1:
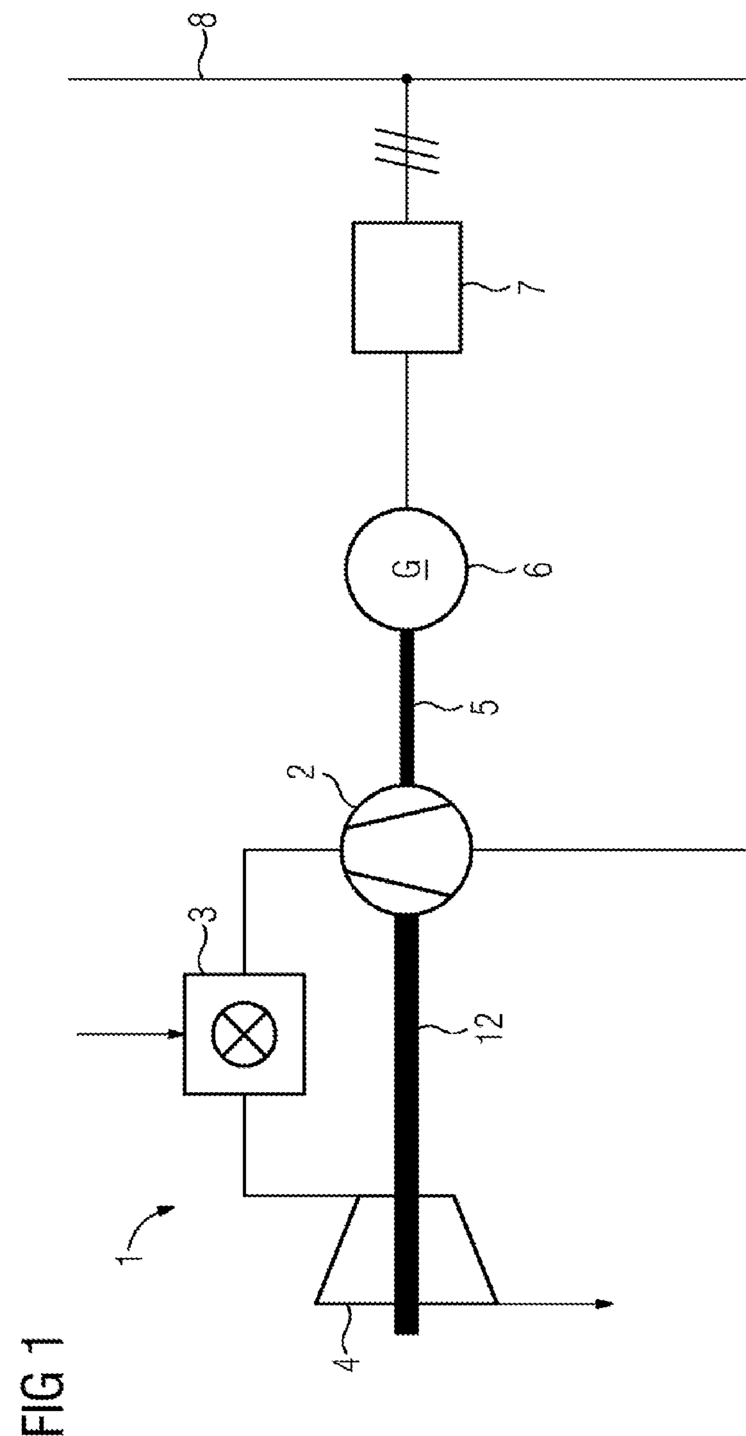
FIG. 1 shows a gas turbine connected to an electrical supply grid.

FIG. 1 shows a gas turbine 1 with a compressor 2, a combustion chamber 3 and a turbine 4 with a rotor 12. In the exemplary embodiment of FIG. 1, the compressor 2 and the turbine 4 are arranged on a common shaft 5. Also arranged on the shaft 5 is a generator 6, which is connected by way of a start-up converter 7 to an energy supply grid 8.

Figure 2:
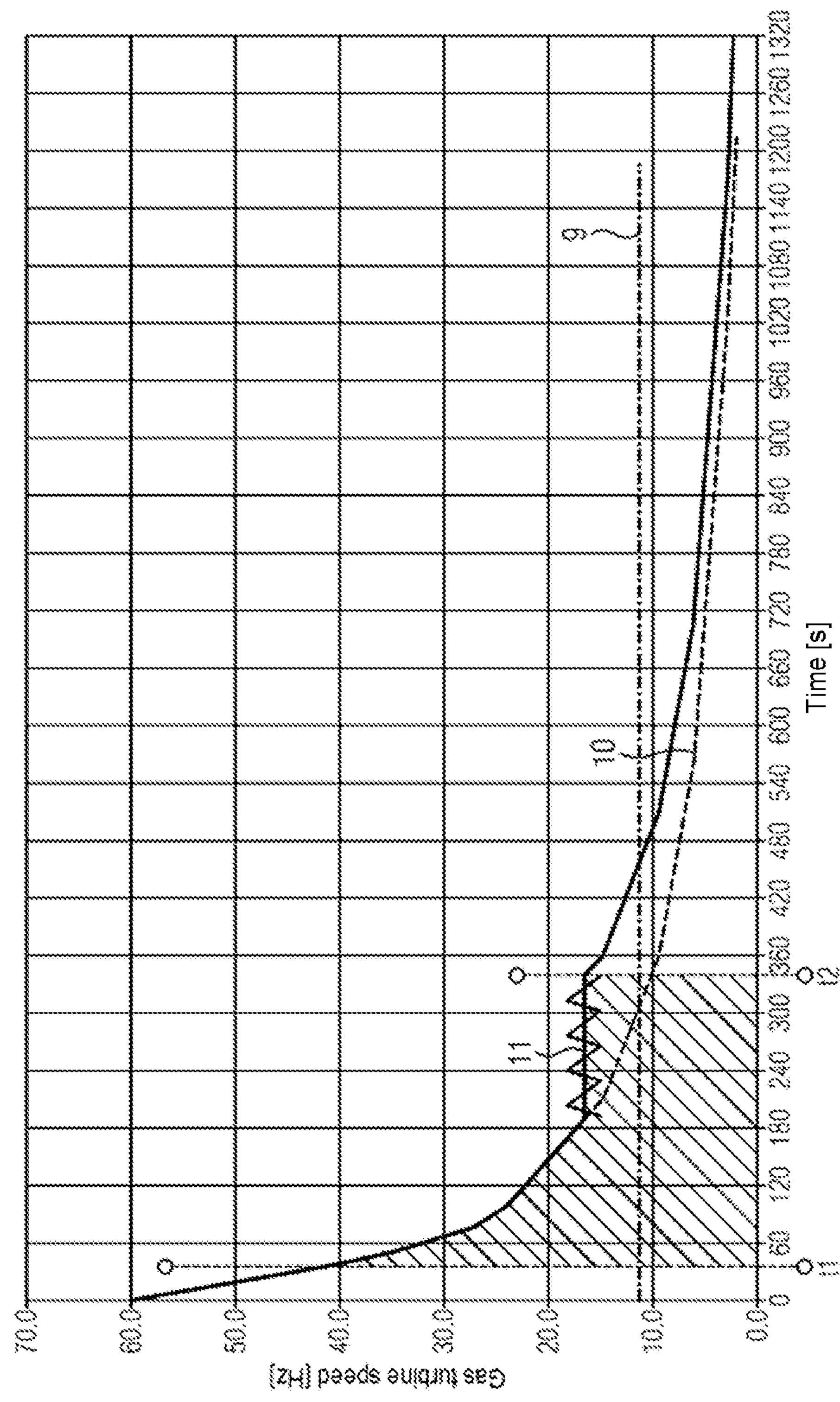
FIG. 2 shows the gas turbine speed during the running-down process according to the invention.

FIG. 2 shows schematically and by way of example the gas turbine speed over time when running down a gas turbine 1 by the method according to the invention.

After switching off the combustion, the rotational speed of the gas turbine 1 is reduced, the rate of change of the speed likewise decreasing with time. Without any further outside intervention, a lower speed limit 9 relevant for flushing processes, which in FIG. 2 is depicted at 8% of the nominal speed, is passed in the downward direction at approximately 300 s and continues to fall (curve with reference numeral 10).

A further criterion for sufficient flushing is its duration at a speed above the lower speed limit 9. This duration is 5 minutes. Since, however, the beginning of flushing should not be seen as at exactly t=0 s, but a few seconds later (the figure shows a more conservative assumption), because a gas lock in the fuel supply must first be closed, the conditions (intensity and duration) for successful flushing are not satisfied at the time t=300 s.

This is where the invention comes in and supports the gas turbine 1 with the aid of the start-up converter 7 and keeps the speed above the lower speed limit 9 relevant for the flushing process. FIG. 2 shows in this respect a curve 11 for an ideal flushing process with a start-up converter 7.

The speed of the gas turbine 1 is in this case kept above the lower speed limit 9 until a minimum duration for the flushing has been reached. In FIG. 2, this minimum duration is defined by the times t1 and t2. The area under the curve 11 and between t1 and t2 represents the flushing volume.

FIG. 2 also shows that the speed of the gas turbine 1 is modulated (by the start-up converter 7). This takes place in order to avoid natural frequencies building up and damaging the installation.

The invention claimed is:

1. A method for flushing a heat recovery steam generator of a power plant with a gas turbine, comprising a compressor, a combustion chamber and a turbine with a rotor, and with a generator coupled to the gas turbine and a start-up converter for converting from an alternating current of any frequency into an alternating current of a specified frequency, wherein the start-up converter is connected to an output of the generator at which the alternating current of any frequency is applied, the method comprising:

when the gas turbine is run down, supporting the rotor with the aid of the start-up converter at a boiler flushing speed and flushing the heat recovery steam generator further until specifications for flushing the heat recovery steam generator are satisfied, wherein, after reaching the boiler flushing speed of the gas turbine, a gas turbine speed is repeatedly raised to reach an upper threshold speed limit and lowered to reach a bottom threshold speed limit.

2. The method as claimed in claim 1, wherein the gas turbine speed is repeatedly raised and lowered at least until a minimum duration for a flushing process has been reached.

3. The method as claimed in claim 2, wherein the minimum duration is 5 minutes.

4. The method as claimed in claim 1, wherein the boiler flushing speed is 8% of the nominal speed.

5. The method as claimed in claim 1, wherein the flushing step includes flushing the heat recovery steam generator with air until explosive fuel mixtures have been flushed out of the heat recovery steam generator; and starting the gas turbine after the flushing step.

6. The method as claimed in claim 5, wherein the flushing step is performed after an interruption in operation of the gas turbine and before the starting step.

7. The method as claimed in claim 1, wherein the supporting and flushing step comprise controlling a rotational speed of the gas turbine from a first speed at a first time to a second speed at a second time over a minimum duration defined by the first time and the second time without the rotational speed going below the boiler flushing speed for the minimum duration.

8. The method as claimed in claim 2, wherein the gas turbine speed does not go below the boiler flushing speed as it is repeatedly raised and lowered.

9. The method as claimed in claim 7, wherein the minimum duration is 5 minutes.

10. The method as claimed in claim 7, further comprising switching off combustion of the gas turbine before the first time.

11. The method as claimed in claim 7, further comprising opening an air intake flap to the compressor.

12. The method as claimed in claim 10, wherein the switching off combustion of the gas turbine comprises closing a gas lock to prevent a flow of gas to the combustion chamber.

13. The method as claimed in claim 10, wherein the rotational speed of the gas turbine is a nominal speed when performing the switching off step and wherein the first speed and the second speed are both less than the nominal speed.

14. The method as claimed in claim 13, wherein the boiler flushing speed is 8% of the nominal speed.

15. The method as claimed in claim 10, wherein the rotational speed of the gas turbine is a nominal speed when performing the switching off combustion step.

16. The method as claimed in claim 7, wherein the first speed and the second speed are both less than a nominal speed of the gas turbine.

17. A method for flushing a heat recovery steam generator of a power plant with a gas turbine, comprising a compressor, a combustion chamber and a turbine with a rotor, and with a generator coupled to the gas turbine and a start-up converter for converting from an alternating current of any frequency into an alternating current of a specified frequency, wherein the start-up converter is connected to an output of the generator at which the alternating current of any frequency is applied, the method comprising:

when the gas turbine is run down, supporting the rotor with the aid of the start-up converter at a rotational speed that is less than a nominal speed of the gas turbine and above a boiler flushing speed for a minimum duration to flush the heat recovery steam generator until explosive fuel mixtures and remains of unburned fuel are removed from the heat recovery steam generator, wherein, after reaching the boiler flushing speed of the gas turbine, a gas turbine speed is repeatedly raised to reach an upper threshold speed limit and lowered to reach a bottom threshold speed limit.

18. The method as claimed in claim 17, wherein the supporting step is performed such that a flushing volume defined as an area under a curve of the rotational speed of the gas turbine over the minimum duration is sufficient to flush the heat recovery steam generator.

19. The method as claimed in claim 17, wherein the rotational speed of the gas turbine is repeatedly raised and lowered during the minimum duration.

* * * * *